United States Patent [19]

Niwa

[11] Patent Number: 4,688,848

[45] Date of Patent: Aug. 25, 1987

[54] SLIDING ROOF FOR AUTOMOBILES

[75] Inventor: Toshiaki Niwa, Saitama, Japan

[73] Assignee: Honda Giken Kogyo Kabushiki Kaisha, Tokyo, Japan

[21] Appl. No.: 858,073

[22] Filed: Apr. 22, 1986

Related U.S. Application Data

[63] Continuation of Ser. No. 623,390, Jun. 22, 1984, abandoned.

[30] Foreign Application Priority Data

Jun. 22, 1983 [JP] Japan ................................ 58-112337

[51] Int. Cl.⁴ ........................ B60J 7/047; B60J 7/057
[52] U.S. Cl. .................................. 296/216; 296/220; 296/223; 296/224
[58] Field of Search .............................. 296/216–218, 296/220–224; 623/390

[56] References Cited

U.S. PATENT DOCUMENTS

| | | | |
|---|---|---|---|
| 4,245,864 | 1/1981 | Shitanoki | 296/222 |
| 4,364,601 | 12/1982 | Katayama et al. | 296/221 |
| 4,403,805 | 9/1983 | Strem, Jr. et al. | 296/221 |
| 4,417,763 | 11/1983 | Schlapp et al. | 296/221 |

FOREIGN PATENT DOCUMENTS

| | | | |
|---|---|---|---|
| 1257321 | 2/1961 | France | 296/222 |
| 0044526 | 3/1982 | Japan | 296/223 |
| 2068304 | 8/1981 | United Kingdom | 296/216 |

Primary Examiner—Robert B. Reeves
Assistant Examiner—Dennis H. Pedder
Attorney, Agent, or Firm—Irving M. Weiner; Joseph P. Carrier; Pamela S. Burt

[57] ABSTRACT

A sliding roof including a frame defining an aperture in an automobile roof, a guide rail disposed on the frame on each side of the aperture, a panel movable for opening and closing the aperture, a lifting and lowering device disposed on the frame adjacent to a rear edge of the aperture for lifting and lowering a rear portion of the panel, and a front stay supporting a front portion of the panel and slidable along the guide rail. The sliding roof also includes a transmission member connected to the front stay and the lifting and lowering device for transmitting a drive force to the front stay and the lifting and lowering device, and a lost motion mechanism interposed between the transmission member and the front stay for preventing the drive force from being transmitted from the transmission member to the front stay while the lifting and lowering device is being driven by the transmission member.

12 Claims, 16 Drawing Figures

SLIDING ROOF FOR AUTOMOBILES

This is a continuation of application Ser. No. 623,390, filed June 22, 1984, abandoned.

BACKGROUND OF THE INVENTION
1. Field of the invention

The present invention relates to a sliding roof for an automobile.

2. Description of the Prior Art:

As is well known, a sliding roof on an automobile includes a movable panel which can be lifted or lowered at its rear portion out of a roof aperture and slid along guides upwardly or downwardly of a rear roof portion of the automobile, thereby opening the roof aperture. The sliding roof also has a lifting and lowering device for moving the rear panel portion upwardly and downwardly, and a panel moving device for moving the panel back and forth. While the rear panel portion is being lifted or lowered, it is preferable that the panel be prevented from moving back and forth.

SUMMARY OF THE INVENTION

According to the present invention, there is provided a sliding roof including a frame defining an aperture in an automobile roof, a guide rail disposed on the frame on each side of the aperture, a panel movable for opening and closing the aperture, a lifting and lowering device disposed on the frame adjacent to a rear edge of the aperture for lifting and lowering a rear portin of the panel, a front stay supporting a front portion of the panel and slidable along the guide rail, a transmission member connected to the front stay and the lifting and lowering device for transmitting a drive force to the front stay and the lifting and lowering device, and a lost motion mechanism interposed between the transmission member and the front stay from preventing the drive force from being transmitted from the transmission member to the front stay while the lifting and lowering device is being driven by the transmission member.

It is an object of the present invention to provide a sliding roof for automobiles in which a panel of the sliding roof can be prevented from moving back and forth while a rear portion of the panel is being lifted or lowered.

Another object of the present invention is to provide a sliding roof for automobiles which has an adjustable position for stopping the forward movement of the panel to close a roof aperture.

The above and other objects, features and advantages of the present invention will become more apparent from the following description when taken in conjunction with the accompanying drawings, in which a preferred embodiment of the present invention is shown by way of illustrative example.

DETAILED DESCRIPTION OF THE PREFERRED EMBODIMENT

Figure 1:
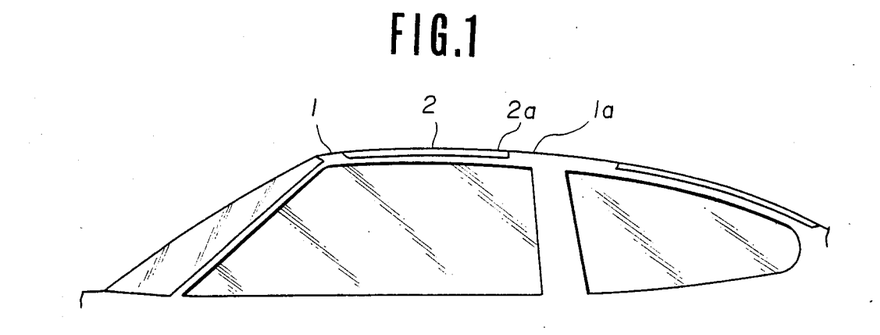
FIGS. 1 through 3 are side elevational views of an automobile roof, showing a sliding roof of the present invention in a fully closed position, a tilted-up position, and a fully open position, respectively.
Figure 2:
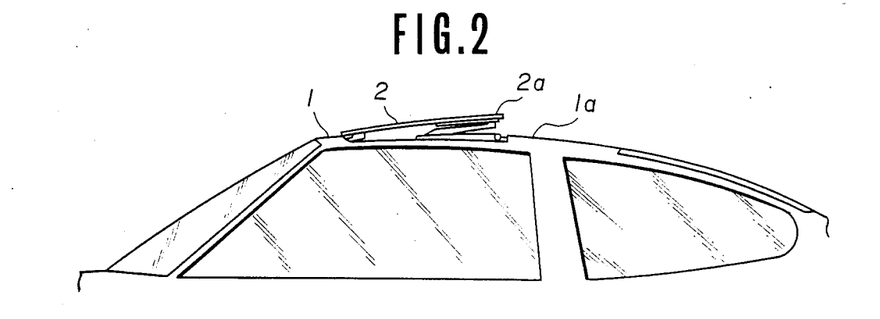
Figure 3:
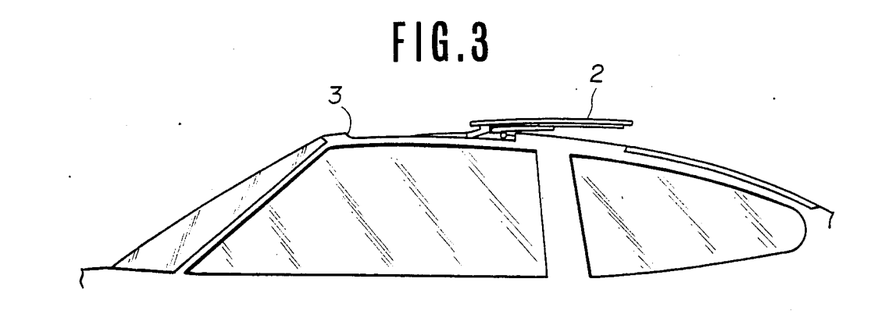

As shown in FIGS. 1 through 3, an automobile includes a roof 1 having an aperture 3 which is closable by a sliding panel 2. The panel 2 has a rear portion 2a tilted upwardly as illustrated in FIG. 2. When the panel 2 is thereafter moved back over a rear roof portion 1a, as shown in FIG. 3, the roof aperture 3 is fully opened to vent the interior of the automobile compartment to the atmosphere.

Figure 4:
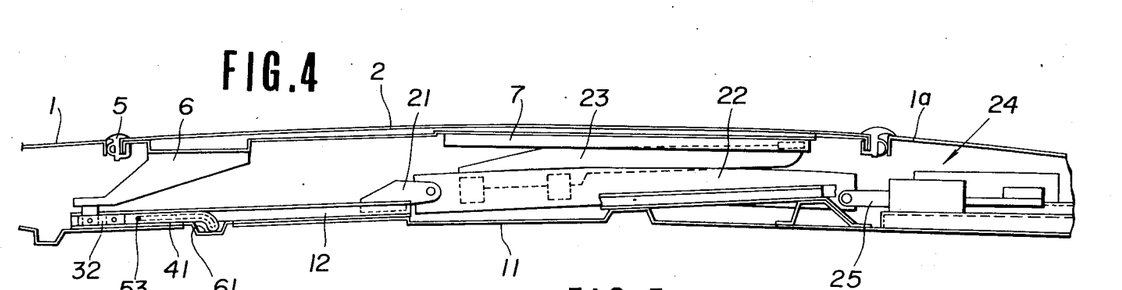
FIGS. 4 through 6 are enlarged side elevational views of the sliding roof, according to the invention illustrating the fully closed position, the tilted-up position, and the fully open position, respectively, of the sliding roof.
Figure 5:
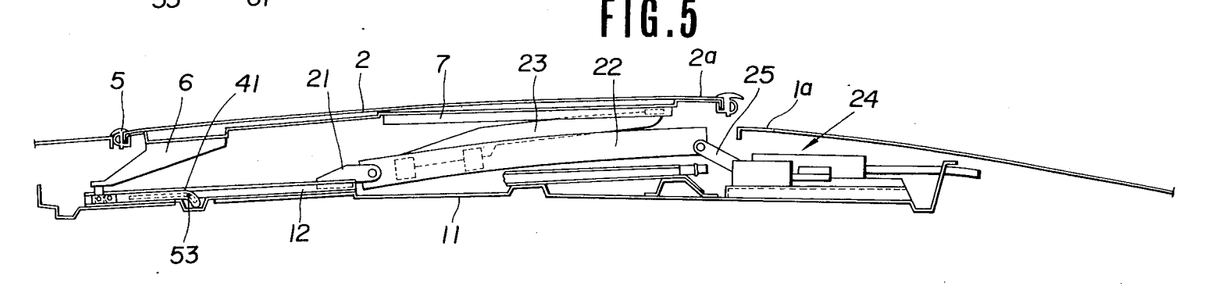
Figure 6:
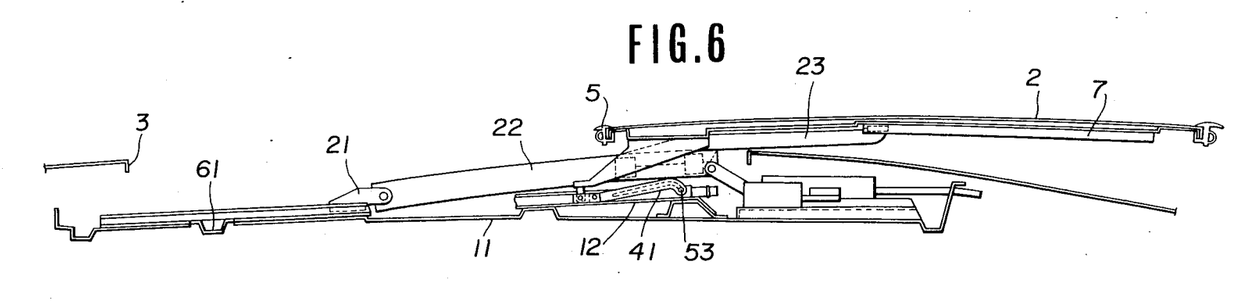

As illustrated in FIGS. 4 through 6, a seal member 5 is fitted over and around the peripheral edge of the panel 2. A pair of front stays 6, 6 (only one shown) is mounted on a lower surface of the panel 2 and depends from a front edge thereof, the front stays 6, 6 being transversely spaced from each other. A pair of guide rails 7, 7 (only one shown) is mounted on the lower surface of the panel 2 and extends from a central portion to a rear edge of the panel 2 in the longitudinal direction of the automobile, the guide rails 7, 7 being transversely spaced from each other.

A frame 11 in the form of a thin sheet is disposed around the roof aperture 3. A pair of main guide rails 12, 12 (only one shown) is disposed on the frame 11 on opposite sides of the roof aperture 3 and extends longitudinally of the automobile.

Figure 8:
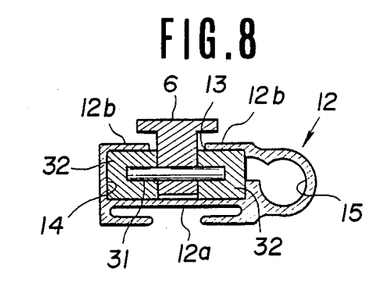
FIG. 8 is a cross-sectional view taken along line VIII—VIII of FIG. 7.
Figure 9:
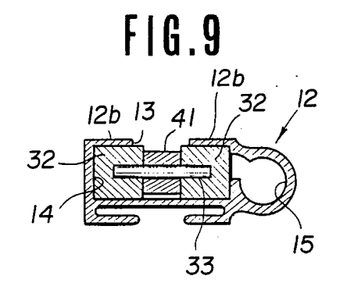
FIG. 9 is a cross-sectional view taken along line IX—IX of FIG. 7.
Figure 10:
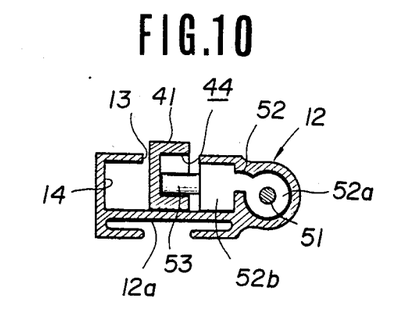
FIG. 10 is a cross-sectional view taken along line X—X of FIG. 7.

As shown in FIGS. 8 through 10, each of the main guide rails 12 has a bottom member 12a, a pair of laterally spaced top members 12b, 12b defining a longitudinal groove 13 therebetween, a guide 14 having a cross section substantially in the shape of a flanged channel, and a drive cable guide 15 joined laterally to the guide 14.

A pair of auxiliary guide rails 22, 22 (only one shown in FIGS. 4 through 6) is disposed above the frame 11 inwardly of the main guide rails 12, respectively, in vertically aligned relation to the guide rails 7, 7 respectively. The auxiliary guide rails 22 extend longitudinally from substantially central portions toward rear portions of the sides of the roof aperture 3 and have front ends thereof pivotally supported on hinges 21 fixed to the frame 11. Between the guide rails 7, 7 and the auxiliary guide rails 22, 22, there is disposed a pair of rear stays 23, 23 (only one shown) having rear and front ends slidably fitted in the guide rails 7, 22, respectively.

Tilt mechanisms 24, 24 (only one shown) are disposed below the rear roof portion 1a at laterally spaced locations and substantially rearward of the main guide rails 12, 12, respectively. Each of the tilt mechanisms 24 has
::::

a tilt lever 25 pivotally coupled to the rear end of one of the auxiliary guide rails 22. When the tilt levers 25 are swung vertically, the rear panel portion 2a is lifted or lowered, as shown in FIGS. 2 and 5, through the auxiliary guide rails 22, the rear stays 23, and the guide rails 7.

Figure 7:
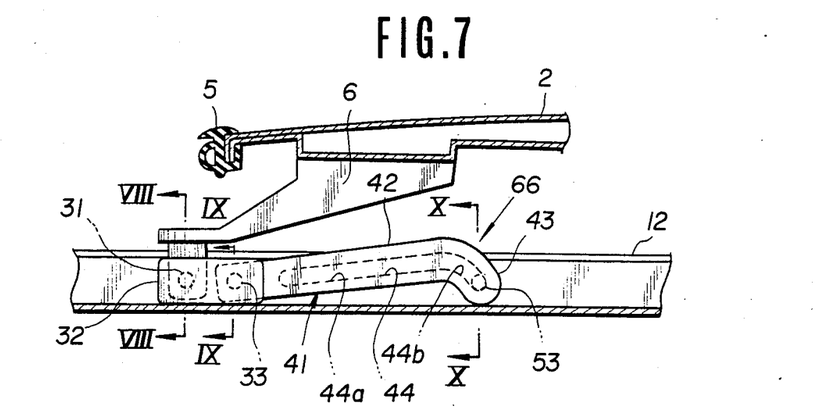
FIG. 7 is a side elevational view of a lost motion mechanism at the time the sliding roof is moved.

As illustrated in FIGS. 7 and 8, sliders 32, 32 are pivotally supported by a pivot shaft 31 on a lower end of the front stay 6, the sliders 32, 32 being positioned one on each side of the lower end of the front stay 6. The sliders 32, 32 are slidably fitted in the guide 14 of each main guide rail 12.

Through this arrangement, any substantial movement of the front portion of the panel 2 relative to the guide rail 12 is prevented.

A link 41 (FIGS. 7 and 9) has a front end thereof pivotally connected by a pivot shaft 33 to rear ends of the sliders 32, 32. The link 41 includes a straight portion 42 extending a substantial distance rearwardly from the front end thereof and a curved portion 43 extending obliquely downwardly from a rear end of the straight portion 42. The link 41 has a guide groove 44 (FIG. 10) defined therein and extending substantially the entire length thereof. The guide groove 44 includes a straight guide groove portion 44a defined in the straight portion 42 and a curved guide groove portion 44b defined in the curved portion 43 and connected to the straight guide groove portion 44a.

Figure 11:
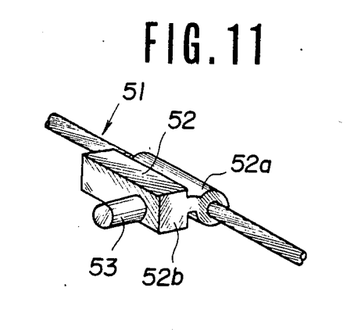
FIG. 11 is a fragmentary perspective view of a drive cable.

As shown in FIGS. 10 and 11, a drive cable 51 with a slide 52 attached thereto is threaded through the drive cable guide 15. The slide 52 is composed of a base portion 52a slidably fitted in the guide 15 and a sliding portion 52b slidably fitted in one side of the guide 14 and having a slide pin 53 laterally projecting into the guide groove 44.

While the panel 1 is sliding back and forth, the lower surface of the curved portion 43 of the link 41 is disposed on the bottom 12a of the main guide rail 12, as shown in FIG. 7, with the slide pin 53 engaging the rear end of the curved guide groove portion 44b, and the link 41 is not angularly moved vertically about the pivot shaft 33. More specifically, when the drive cable 51 is moved back and forth with the slide pin 53 engaging the rear end of the curved guide groove portion 44b, the panel 2 is slid back and forth in unison with the drive cable 51 through the link 41, the sliders 32, and the front stays 6.

Figure 12:
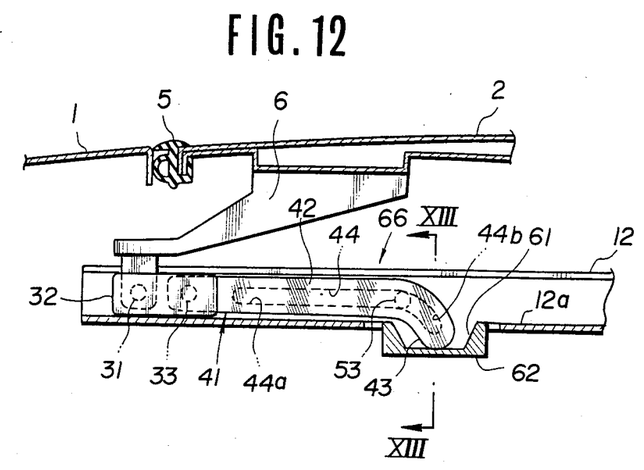
FIG. 12 is a side elevational view of the lost motion mechanism at the time the sliding roof is fully open.

As shown in FIGS. 4, 6 and 12, the bottom 12a of the guide 14 has a cavity 51 in which the curved portion 43 of the link 41 can fit when the seal member 5 on the front edge of the panel 2 is substantially held in resilient contact with a front edge of the roof aperture 3. Upon the curved portion 43 being positioned in the cavity 61, the straight guide groove portion 44a extends substantially parallel to the guide 14.

Figure 13:
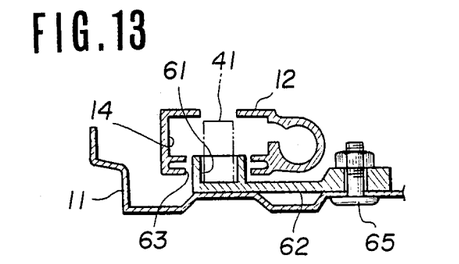
FIG. 13 is a cross-sectional view taken along line XIII—XIII of FIG. 12.
Figure 14:
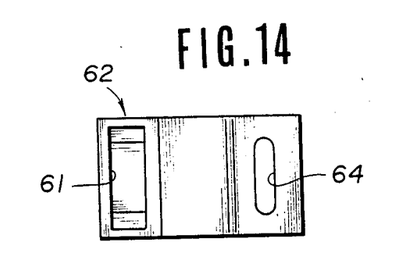
FIG. 14 is a plan view of an adjusting member.

In the illustrated embodiment, the cavity 61 is defined in a portion of an adjustment member 62 as shown in FIG. 13. The adjustment member 62 is attached to the frame 11 by a bolt 65 extending through an oblong attachment hole 64 in the adjustment member 62 with the cavity 61 positioned in a recess 63 defined in the bottom 12a of the guide 14. Thus, the adjustment member 62 is positionally adjustable in the longitudinal direction of the main guide rail 12 when the bolt 65 is loosened. While the curved portion 43 of the link 41 is located in the cavity 61 and the slide pin 65 of the slide 52 is sliding in and along the guide groove 44, no tensile or pulling force is transmitted from the drive cable 51 to the front stay 6, and hence the members designated 61, 41, 43, 52, 53, 44 jointly constitute a lost motion mechanism 66. As shown and discussed, the lost motion mechansim, excluding cavity 61, is slidable within the guide rail 12.

Figure 15:
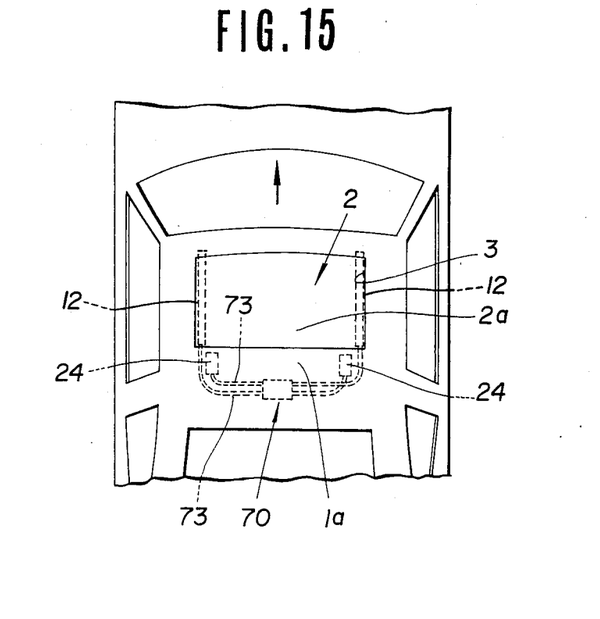
FIG. 15 is a plan view showing the location of a drive device in an automobile.
Figure 16:
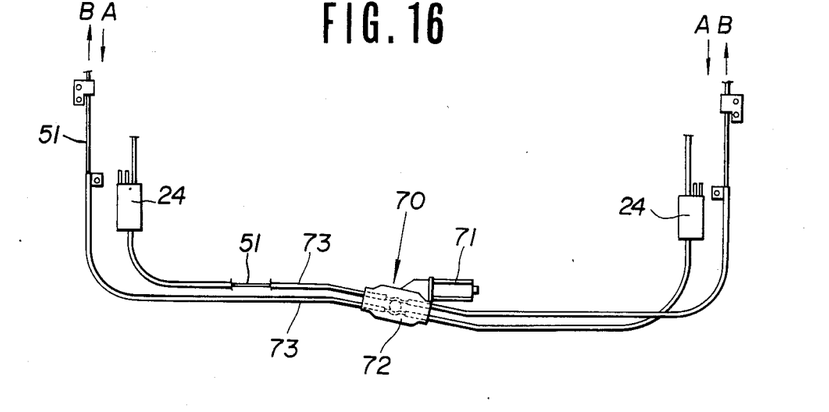
FIG. 16 is an enlarged plan view of the drive device.

FIGS. 15 and 16 illustrate a drive device 70 for driving the tile mechanisms 24 and the sliding panel 2. The drive device 70 comprises a motor 71 disposed below the rear roof portion 1a, a gear box 72 connected to the motor 71, and a pair of the drive cables 51 disposed in outer cable sheaths 73 and slidable back and forth therein by the gear box 72. The cables 51 are connected at first ends thereof to the tilt mechanisms 24 and at the other ends through the lost motion mechanisms 66 to the front stays 6.

Operation of the sliding roof as thus constructed will be described below.

The tilt mechanisms 24 are adapted to be actuated to tilt the rear portion 2a of the panel 2 upwardly when the drive cables 51 are moved back in the direction of the arrows A in FIG. 16 to open the sliding panel 2. At this time, the curved portions 43 of the links 41 are located in the cavities 61 in the main guide rails 12, and the slide pins 53 move rearwardly in and along the straight guide groove portions 44a in the links 41, during which time the panel 2 is not moved back (FIGS. 5 and 12).

As the slide pins 53 enter the curved guide groove portions 44b, the links 41 swing upwardly about the pivot shafts 33 since the slide pins 53 move only horizontally with the drive cables 51. When the slide pins 53 hit the rear ends of the curved guide groove portions 44b (FIG. 7), the panel 2 starts moving rearwardly until it reaches the fully open position as shown in FIG. 6. When it is desired to bring the panel 2 from the fully open position to the fully closed position, the drive cables 51 are moved forwardly in the direction of the arrows B in FIG. 16. The panel 2 is now moved forwardly with the slide pins 54 held against the rear ends of the curved guide groove portions 44b. When the panel 2 reaches the fully closed position as shown in FIG. 12, the curved portions 43 of the links 41 enter the cavities 61, allowing the slide pins 53 out of the curved guide groove portions 44b. The tilt mechanisms 24 are adapted to be operated to tilt the rear panel portion 2a downwardly to thereby close the roof aperture 3, while the slide pins 53 are subsequently moving forwardly along the straight guide groove portions 44a. There is provided a suitable relief mechanism (not shown) for preventing driving forces of the drive cables 51 from acting on the panel 2 after the panel 2 has been moved upwardly or downwardly by the tilt mechanisms 24.

With the present invention, therefore, while the slide pins 53 are sliding in and along the guide grooves 44 in the links 41, the sliding panel 2 is not moved back and forth, to allow the tilt mechanisms 24 to be operated smoothly. Thus, the tilt mechanisms 24 can be operated and the panel 2 can be moved back and forth by the single drive device.

Since the cavities 61 for moving the links 41 vertically are positionally adjustable back and forth, the position in which the sliding panel 2 is to be stopped in its front end of stroke can easily be varied by adjusting the adjustment member 62 back and forth.

While in the illustrated embodiment the cavities 61 are employed for moving the links 41 upwardly and downwardly, simple through holes defined in the guide rails 12 may be used instead of the cavities 61, provided such recesses are of a shape capable of angularly moving the links 41.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A sliding roof in an automobile having a roof aperture, comprising:
   (a) a frame defining a roof aperture;
   (b) a guide rail disposed on said frame on each of side of said roof aperture;
   (c) a panel movable for opening and closing said roof aperture;
   (d) a lifting and lowering device disposed on said frame adjacent to a rear edge of said roof opening for lifting and lowering a rear portion of said panel;
   (e) a front stay supporting a front position of said panel and slidable along said guide rail, said front stay being fixed to said panel;
   (f) a transmission member connected to said front stay and said lifting and lowering device for transmitting a drive force to said front stay and said lifting and lowering device; and
   (g) a lost motion mechanism slidable within said guide rail and interposed between said transmission member and said front stay for preventing the drive force from being transmitted from said transmission member to said front stay while said lifting and lowering device is being driven by said transmission member.

2. A sliding roof according to claim 1, wherein said guide rail includes a portion defining a cavity, said lost motion mechanism comprises a link pivotally mounted on said front stay and having guide groove extending in the longitudinal direction of the vehicle defined therein, a pin movable with said transmission member and slidably engaging in said guide groove in said link, and an engagement portion on said link for engaging in said cavity, said cavity being positioned such that said engagement portion engages in said cavity while the driving force is being transmitted from said transmission member to said lifting and lowering device.

3. A sliding roof according to claim 2, wherein said link includes a straight portion extending rearwardly from one end thereof and a smaller curved portion curved downwardly from a rear end of the straight portion, said guide groove including a straight guide groove portion defined in and along said straight portion of said link and a curved guide groove portion defined in and along said curved portion of said link and contiguous to said straight guide groove portion.

4. A sliding roof according to claim 2, wherein said cavity portion is positionally adjustable in the longitudinal direction of said guide rail.

5. A sliding roof for vehicles of the type in which a slidable panel slides outwardly and rearwardly of a roof opening, comprising:
   (a) a frame defining a roof aperture;
   (b) a guide rail disposed on said frame on each side of said roof aperture;
   (c) a panel movable for opening and closing said roof aperture;
   (d) a lifting and lowering device disposed on said frame adjacent to a rear edge of said roof opening for lifting and lowering a rear portion of said panel;
   (e) a front stay supporting a front portion of said panel and slidable along said guide rail, said front stay being fixed to said panel;
   (f) a transmission member connected to said front stay and said lifting and lowering device for transmitting a drive force to said front stay and said lifting and lowering device; and
   (g) a lost motion mechanism slidable within the guide rail and interposed between said transmission member and said front stay for preventing the drive force from being transmitted and said transmission member to said front stay while said lifting and lowering device is being driven by said transmission member.

6. A sliding roof according to claim 5, wherein said guide rail includes a portion defining a cavity, said lost motion mechanism comprises a link pivotally mounted on said front stay and having a guide groove extending in the longitudinal direction of the vehicle defined therein, a pin movable with said transmission member and slidably engaging in said guide groove in said link, and an engagement portion on said link for engaging in said cavity, said cavity being positioned such that said engagement portion engages in said cavity while the driving force is being transmitted from said transmission member to said lifting and lowering device.

7. A sliding roof according to claim 6, wherein said link includes a straight portion extending rearwardly from one end thereof and a smaller curved portion curved downwardly from a rear end of the straight portion, said guide groove including a straight guide groove portion defined in and along said straight portion of said link and a curved guide groove portion defined in and along said curved portion of said link and contiguous to said straight guide groove portion.

8. A sliding roof according to claim 6, wherein said cavity portion is positionally adjustable in the longitudinal direction of said guide rail.

9. A sliding roof in an automobile having a roof aperture, comprising:
   (a) a frame defining a roof aperture;
   (b) a guide rail disposed on said frame on each side of said roof aperture;
   (c) a panel movable for opening and closing said roof aperture;
   (d) a lifting and lowering device disposed on said frame adjacent to a rear edge of said roof opening for lifting and lowering a rear portion of said panel;
   (e) a front stay supporting a front portion of said panel and slidable along said guide rail, said front stay being fixed to said panel;
   (f) a transmission member connected at one end thereof to said front stay and directly connected at an opposite end thereof to said lifting and lowering device for transmitting a drive force to said front stay and said lifting and lowering device; and
   (g) a lost motion mechanism interposed between said transmission member and said front stay for preventing the drive force from being transmitted from said transmission member to said front stay while said lifting and lowering device is being driven by said transmission member.

10. A sliding roof for vehicles of the type in which a slidable panel slides outwardly and rearwardly of a roof opening, comprising:
(a) a frame defining a roof aperture;
(b) a guide rail disposed on said frame on each side of said roof aperture;
(c) a panel movable for opening and closing said roof aperture;
(d) a lifting and lowering device disposed on said frame adjacent to a rear edge of said roof opening for lifting and lowering a rear portion of said panel;
(e) a front stay supporting a front portion of said panel and slidable along said guide rail, said front stay being fixed to said panel;
(f) a transmission member connected at one end thereof to said front stay directly connected an opposite end thereof to said lifting and lowering device for transmitting a drive force to said front stay and said lifting and lowering device; and
(g) a lost motion mechanism interposed between said transmission member and said front stay for preventing the drive force from being transmitted from said transmission member to said front stay while said lifting and lowering device is being driven by said transmission member.

11. A sliding roof according to claim 9, wherein:
said front stay has an upper portion fixed to said panel and a lower portion pivotally and slidably mounted to said guide rail so that any substantial vertical movement of the front portion of said panel relative to said guide rail is prevented.

12. A sliding roof according to claim 10, wherein:
said front stay has an upper portion fixed to said panel and a lower portion pivotally and slidably mounted to said guide rail so that any substantial vertical movement of the front portion of said panel relative to said guide rail is prevented.

* * * * *

UNITED STATES PATENT AND TRADEMARK OFFICE
CERTIFICATE OF CORRECTION

PATENT NO. : 4,688,848
DATED : August 25, 1987
INVENTOR(S) : Toshiaki NIWA

It is certified that error appears in the above-identified patent and that said Letters Patent is hereby corrected as shown below:

Column 1, lines 7-8, after "INVENTION" provide new paragraph for "1. Field of the Invention"

Column 1, line 31, correct the spelling of --portion--.

Column 3, line 49, change "51" to --61--.

Column 3, line 66, change "65" to --53--.

Column 4, line 7, change "tile" to --tilt--.

Column 4, line 39, change "54" to --53--.

Column 5, line 25, (claim 1, line 11) change "position" to --portion--.

Column 7, line 16, (claim 10, line 16) after "stay" insert --and--.

Signed and Sealed this

Twenty-third Day of February, 1988

Attest:

DONALD J. QUIGG

*Attesting Officer*         *Commissioner of Patents and Trademarks*